Oct. 9, 1962

H. MAHN 3,057,251

PHOTOMETRIC SYSTEM FOR CINEMATOGRAPHIC CAMERAS

Filed Dec. 14, 1959

INVENTOR:

Herbert Mahn

BY

Karl F. Ross

AGENT 3,057,251
PHOTOMETRIC SYSTEM FOR CINEMATOGRAPHIC CAMERAS
Herbert Mahn, Bad Kreuznach, Rhineland, Germany, assignor to Jos. Schneider & Co., Optische Werke, Kreuznach, Rhineland, Germany, a corporation of Germany
Filed Dec. 14, 1959, Ser. No. 859,447
Claims priority, application Germany Dec. 16, 1958
6 Claims. (Cl. 88—16)

The present invention relates to cinematographic cameras provided with a photometric device for the measurement of the intensity of the light admitted through the objective.

Heretofore, the measurement of luminous intensity for the control of the diaphragm aperture, either by automatic action or by the intervention of an operator reading the measured values on a suitable indicator, has been possible only in the intervals between picture takes since, for this purpose, it had been necessary to interpose a photosensitive element between the objective and the film. Such systems, therefore, did not permit a continuous readjustment of the diaphragm aperture during picture taking in accordance with varying lighting conditions.

The invention has for its object the provision of means for enabling the continuous functioning of a photometric device in both the operated and the unoperated condition of a cinematographic camera.

The above object is realized, in accordance with the present invention, by the provision of an otherwise conventional shutter disk so shaped or disposed that, in those positions in which the disk obstructs the passage of light from the objective to the film, its surface reflects the incident light rays upon a photocell or other photosensitive element which in turn controls a visual indicator and/or the diaphragm of the camera. Advantageously, the reflected light rays pass substantially at right angles to the optical axis of the objective, this being accomplished either by giving the optically effective surface of the shutter disk a frustoconical shape or by positioning the disk at an angle of 45° to the optical axis. The light rays impinging upon the photosensitive element may in turn be further reflected, at least in part, toward a viewfinder associated with the camera.

The invention will be described in greater detail with reference to the accompanying drawing in which.

Figure 1:
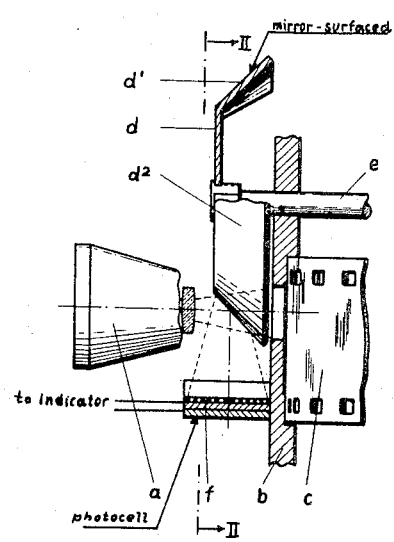
FIG. 1 is a top view, partly in section, of a system embodying the invention.
Figure 2:
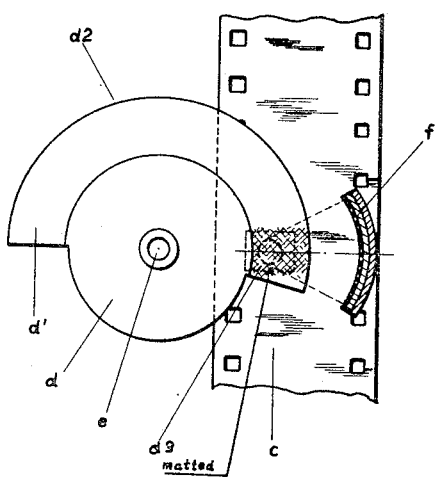
FIG. 2 is a front-elevational view taken on the line II—II of FIG. 1.

In FIGS. 1 and 2 there is shown at $b$ a part of the housing of a cinematographic camera not further illustrated. This housing has an aperture $b'$ through which light from an objective $a$ is intermittently directed upon a film $c$ under the control of a shutter disk $d$. The shaft $e$ of disk $d$, extending parallel to the optical axis of objective $a$, is coupled with the film-transport mechanism (not shown) in the usual manner. The optically effective portion of disk $d$ has skirt $d^2$ extending over the major part of a frustoconical surface with an apex angle of 90°. The outer surface $d'$ of skirt $d^2$ is provided with a mirror finish so as to reflect substantially all the incident light from objective $a$ upon a photocell $f$, the latter being advantageously curved (as best seen in FIG. 2) in approximately co-axial relationship with disk $d$ to intercept a maximum of the reflected light rays.

In FIG. 2 there is illustrated the position which shutter disk $d$ occupies between frames, i.e. with the film-transport mechanism at standstill; to this inactive position the camera returns whenever the taking of pictures is interrupted. Since during operation the incident light is reflected only intermittently toward the photocell $f$, its average intensity as measured by the photocell would be a fraction of that adapted to be reflected by the stationary disk. In order to equalize the output of the photocell during both standstill and rotation of the shutter, it is desirable to reduce the amount of light which reaches the cell $f$ in the position of FIG. 2. This is best accomplished by dulling or matting the part $d^3$ of disk surface $d'$ which lies in line with the objective $a$ in the inactive position of the camera.

Figure 3:
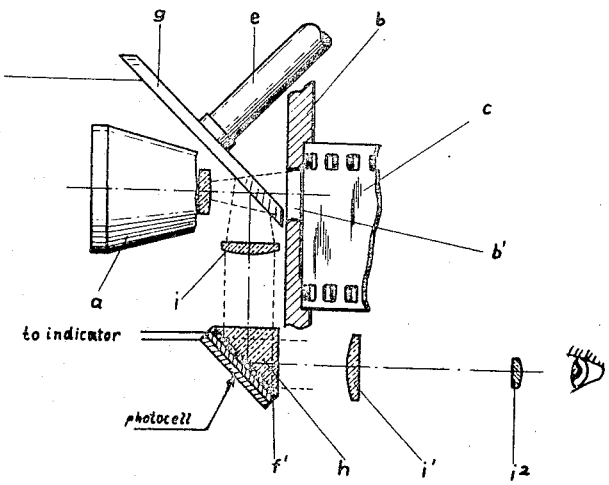
FIG. 3 is a top view, similar to FIG. 1, of a modified system according to the invention.

In the system of FIG. 3 there has been shown provided a modified shutter disk $g$, its shaft $e$ being here positioned at an angle of 45° to the optical axis of objective $a$. The flat underside $g'$ of disk $g$ is now provided with the necessary mirror finish, and preferably also with a matted portion as described above, to reflect the incoming light rays through a lens $i$ toward the photocell $f'$ whose receiving surface is flat, rather than cylindrical as in the case of cell $f$, and inclined at substantially the same angle as surface $g'$. A reflecting member such as a prism $h$ intercepts the light rays coming from surface $g'$, which form a substantially parallel field after passing through lens $i$ and redirects a substantial portion thereof to the eye of an observer via the lenses $i'$, $i^2$ of a conventional viewfinder. The output of photocell $f'$ is again utilized for the control of a diaphragm (not shown) by direct or indirect means.

The invention is, of course, not limited to the specific embodiments described and illustrated but may be realized in various modifications without departing from the spirit and scope of the appended claims.

I claim:

1. In a cinematographic camera, in combination, an optical objective, a rotatable shutter disk beyond said objective rotatable about an axis parallel to the optical axis of the objective and intermittently interposable in the path of light rays passing from said objective toward a cinematographic film, said shutter disk being provided with a light-obstructing portion extending over part of a frustoconical area, said portion being provided with a reflecting surface, and photosensitive means for measuring the intensity of said light rays, said photosensitive means including a light-responsive element curved in a manner generally coaxial with said disk and positioned to receive light rays reflected by said surface upon the interposition of said shutter disk in said path.

2. The combination according to claim 1, further comprising view-finder means, and secondary reflecting means ahead of and combined with said light-responsive element for directing a part of the incident light rays onto said view-finder means.

3. The combination according to claim 2 wherein said secondary reflecting means comprises a prism.

4. The combination according to claim 2, further comprising focusing means ahead of said secondary reflecting means for forming said incident rays into a substantially parallel field.

5. The combination according to claim 1 wherein said surface is provided with a restricted portion aligned with said objective in a normal quiescent position of said shutter disk, said restricted portion being less reflecting than the remainder of said surface to an extent substantially equalizing the average amount of light received by said light-responsive element in the operated and the unoperated condition of said shutter disk.

6. In a cinematographic camera, in combination, an optical objective, shutter means beyond said objective intermittently interposable in the path of light rays passing from said objective toward a cinematographic film, said shutter means being provided with a reflecting surface, photosensitive means for measuring the intensity of said light rays, said photosensitive means including a light-responsive element positioned to receive light rays reflected by said surface upon the interposition of said shutter means in said path, said surface being provided with a restricted portion aligned with said objective in a normal quiescent position of said shutter means, said restricted portion being less reflecting than the remainder of said surface to an extent substantially equalizing the average amount of light received by said light-responsive element in the operated and the unoperated condition of said shutter means.

References Cited in the file of this patent

UNITED STATES PATENTS

| | | |
|---|---|---|
| 1,934,484 | Camilli | Nov. 7, 1933 |
| 1,980,217 | Moreno | Nov. 13, 1934 |
| 2,498,188 | Vinten | Feb. 21, 1950 |

FOREIGN PATENTS

| | | |
|---|---|---|
| 934,930 | Germany | Nov. 10, 1955 |